GEORGE E. BAILEY.
Bakers Oven.
No. 121,573. Patented Dec. 5, 1871.
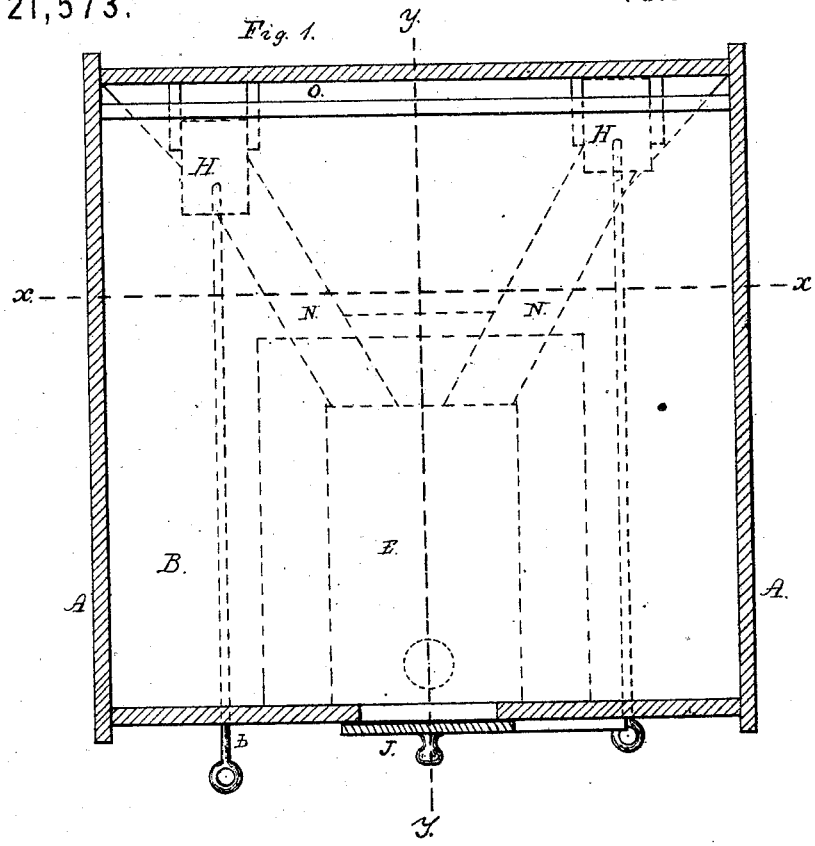
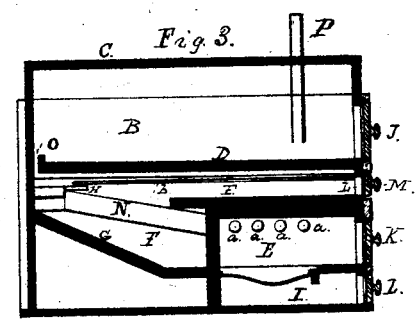
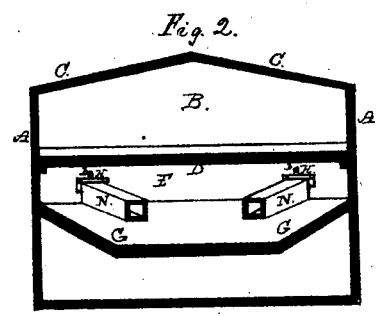

UNITED STATES PATENT OFFICE.

GEORGE E. BAILEY, OF MANSFIELD, MASSACHUSETTS.

IMPROVEMENT IN BAKERS' OVENS.

Specification forming part of Letters Patent No. 121,573, dated December 5, 1871.

*To all whom it may concern:*

Be it known that I, GEORGE E. BAILEY, of Mansfield, in the county of Bristol and State of Massachusetts, have invented certain new and useful Improvements in Ovens; and that the following is a full, clear, and exact description of the same, reference being had to the accompanying drawing.

These improvements relate more particularly to ovens intended for the baking of bread, crackers, cake, and other articles of food, although an oven constructed according thereto is susceptible of use for drying and other purposes.

Heretofore the ovens most in common use, for the baking of crackers and bread more especially, have been constructed to be heated by making the oven-chamber the combustion-chamber, requiring a withdrawal of the debris or cinders from the oven before inserting the material to be baked. To such ovens there are many objections, among which may be mentioned that much time is lost; that a large amount of fuel is required, owing to the fact that a heat must be given to the oven much above what is actually required to compensate for the heat lost on withdrawing the cinders; that the heat throughout the oven is not even, it being the greatest at the upper portion of the oven, thus producing an uneven baking of the bread or crackers, and causing, to a greater or less degree, the browning or burning of the upper side of the bread or crackers, or, in other words, a very uneven baking. To overcome these several objections has been the object of many inventions heretofore invented and patented, among which it may be well to refer to ovens having a wheel, if it may be so called, adapted to receive the bread or crackers to be baked, and to be revolved by power, so as to subject the same to the heat of the oven at the varying degrees therein; and also to refer to ovens having the fire-chamber within it, but bounded by walls, the oven more or less surrounding it; and also to ovens in which the fire-pot is below but at its upper side in direct contact with the oven floor, in both of which latter cases, however, an uneven diffusion of the heat is the result.

The main object of this invention is to secure a uniform heat throughout the oven-chamber—that is, securing no greater heat at the bottom than at the top—and, in addition thereto, so arranging the heating apparatus as to economize fuel and time in the running of the oven. Under this invention the oven proper is constructed in any of the ordinary modes—that is, of brick or masonry—provided with a door or doors suitably arranged for convenience to enter the same. The fire-chamber proper is outside of and at the front portion of the oven, within a chamber constructed under the whole extent of the oven floor separating it from the fire-pot. This chamber containing the fire-pot is in communication with the fire-pot through apertures in the walls to the fire-pot, and also with the oven proper at the rear end of the oven-floor, which is there left open; and the fire-pot, in addition to the above communication with the oven-chamber, is connected therewith by flues or passages leading direct from it through the chamber in which it is arranged to the rear open portion of the oven-floor. These passages, in their length, are closed to the chamber containing the fire-pot, and are provided with suitable dampers, and are entirely free and clear of the oven-floor. The chamber containing the fire-pot is constructed with its floor on an inclination from the boundaries of the oven-floor toward the fire-pot proper.

In the accompanying drawing my improvements in ovens are illustrated, Figure 1 being a horizontal section through the oven-chamber; Fig. 2, a transverse vertical section in plane of line $x\ x$, Fig. 1; Fig. 3, a central vertical longitudinal section in plane of line $y\ y$, Fig. 1.

A in the drawing represents an outer casing, which may be made of brick or other masonry, or of any other suitable material; B, the oven-chamber proper, located within the upper portion of the masonry A, and made with an interior-arched top, C, and with a horizontal floor, D, constructed, by preference, of tiles and soapstone, as ordinarily; J, door for entering oven B; F, a chamber within the masonry A below the floor D to the oven B, and between this chamber F and the oven B there is an open and free communication at the rear of oven-floor G; E, the fire-pot, arranged by its walls within the chamber F at the front thereof. This fire-pot is considerably less in width than the chamber F, and only extends toward the rear of the chamber for a portion of its depth. The fire-pot E is closed upon its upper side, and between its upper side and the oven the chamber F extends unobstructed; and it is furthermore upon its sides made with apertures a, making a communication between the fire-pot E and the chamber F. K, door opening into fire-pot; I, ash-pit; and L, its door. M, a door opening into chamber F and into the portion thereof between the top of the fire-pot and bottom of the oven-floor; G, the floor to chamber F, which floor is made inclining from the boundaries of the oven-floor to the walls of the fire-pot E; N, pipes or passages leading from the fire-pot to the corners, or nearly so, of the opening O along the rear of the oven-floor; and H, damper-slides in said passages N, which passages are entirely distinct and separate from and not in contact with the oven-floor. P, the escape-flue at the front end and upper portion of oven B.

With the dampers H to the passages N open, the operation of the oven constructed as above described is as follows: The products of combustion pass through the passages N to the oven-chamber, escaping more or less into the chamber below the oven-floor, and from it passing into the oven, imparting in both instances heat to the oven—in the one instance by entering the oven, passing upward and following its top, heating the upper portion of the oven; and in the other through the oven-floor, heating the bottom portion of the oven, the described inclination of the floor to the chamber, as is obvious, causing the products of combustion to be the more thoroughly and perfectly thrown in contact with the oven-floor. When the dampers H are closed the products of combustion pass through the apertures a of the fire-pot into the chamber below the oven-chamber, whence, through the inclination of the floor, they escape, as described, and are brought more directly and perfectly in contact with the oven-floor, flowing, finally, into the oven-chamber through the open space at the rear, and thence to the escape-flue.

Among many advantages secured by my invention may be mentioned the following: That fuel is saved; that the oven can be used continuously, not requiring to be reheated; that a uniform heat can be obtained through the whole surface of the oven; that it is adapted for all kinds of baking, bread, cake, crackers, &c.; that it is simple and requires no power, as with other ovens, to run it.

Having thus described my invention, what I claim, and desire to secure by Letters Patent, is—

1. The combination of the oven B and fire-pot E, when the fire-pot is below the oven, with an air-space between them, and is connected to the oven by flues or pipes N, substantially as described, for the purpose specified.

2. The combination of the fire-pot E, oven B, and chamber F about fire-pot E, said chamber F being in communication with the fire-pot and having an inclined floor, G, substantially as and for the purpose described.

The above specification of my invention signed by me this 18th day of July, A. D. 1871.

GEORGE E. BAILEY.

Witnesses:
EDWIN W. BROWN,
J. P. MCELROY.

(6)